United States Patent
Yang et al.

(10) Patent No.: US 9,662,723 B2
(45) Date of Patent: May 30, 2017

(54) METHOD AND SYSTEM FOR COMBINED SHEARING OF STEEL PLATE

(71) Applicant: BAOSHAN IRON & STEEL CO., LTD., Shanghai (CN)

(72) Inventors: Saidan Yang, Shanghai (CN); Junliang Qiao, Shanghai (CN); Qi Yan, Shanghai (CN); Shengbo Pan, Shanghai (CN); Ruimin Wu, Shanghai (CN); Chengguo Jin, Shanghai (CN); Qian Xiang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 90 days.

(21) Appl. No.: 14/410,915

(22) PCT Filed: Apr. 28, 2014

(86) PCT No.: PCT/CN2014/076350
§ 371 (c)(1),
(2) Date: Dec. 23, 2014

(87) PCT Pub. No.: WO2014/177034
PCT Pub. Date: Nov. 6, 2014

(65) Prior Publication Data
US 2016/0089731 A1 Mar. 31, 2016

(30) Foreign Application Priority Data
Apr. 28, 2013 (CN) .......................... 2013 1 0156882

(51) Int. Cl.
*B23D 31/02* (2006.01)
*B23K 26/38* (2014.01)
(Continued)

(52) U.S. Cl.
CPC .......... *B23D 31/02* (2013.01); *B23K 26/0846* (2013.01); *B23K 26/38* (2013.01);
(Continued)

(58) Field of Classification Search
CPC ........ B23D 31/02; B23K 26/38; B23K 26/40; B23K 37/0408; B23K 2203/04
(Continued)

(56) References Cited

U.S. PATENT DOCUMENTS

| 6,775,888 B1 * | 8/2004 | Wegener | ................ B21D 43/05 219/121.63 |
| 7,346,973 B2 * | 3/2008 | Ooe | ..................... B23Q 7/1478 29/563 |

(Continued)

FOREIGN PATENT DOCUMENTS

| CN | 102172835 A | 9/2011 |
| CN | 103600234 A | 2/2014 |

(Continued)

OTHER PUBLICATIONS

PCT International Search Report, PCT/CN2014/076350, Jul. 16, 2014, 4 pages.

*Primary Examiner* — Samuel M Heinrich
(74) *Attorney, Agent, or Firm* — Quarles & Brady LLP

(57) ABSTRACT

A method for combined shearing of a steel plate adopts a combination of unrolling and pendulum shearing with laser cutting, wherein after a steel roll is cut by unrolling and pendulum shearing to obtain sheets having a specified length, a part or all of the sheets are directly conveyed to a stack as finished sheet materials and the other part or all of the sheets are transferred to a laser cutting line by means of lateral material discharge from a unrolling and pendulum cutting line, and are picked up by a loading robot and moved to a laser cutting position to subject to a secondary cutting, (Continued)

so as to finally obtain profiled sheet materials which are picked up by a discharged material handling and stacking robot for an operation of stacking the finished products. By a method and system for combined shearing of a steel plate, the present invention achieves laser cutting of a profiled material by lateral material discharge from a blanking from a pendulum cutting line, and can share other functional segments of a production line; meanwhile, two blanking methods are combined to achieve cutting of a sheet of any shape, optimizing and improving the function of the production line and reducing the footprint and equipment investment costs.

13 Claims, 3 Drawing Sheets

(51) Int. Cl.
- *B23K 26/40* (2014.01)
- *B23K 37/04* (2006.01)
- *B23K 26/08* (2014.01)
- *B23D 31/00* (2006.01)
- *B23K 101/16* (2006.01)
- *B23K 103/04* (2006.01)

(52) U.S. Cl.
CPC .......... *B23K 26/40* (2013.01); *B23K 37/0408* (2013.01); *B23D 31/00* (2013.01); *B23K 2201/16* (2013.01); *B23K 2203/04* (2013.01)

(58) Field of Classification Search
USPC ..... 219/121.67, 121.72; 29/34 R, 564, 33 C, 29/33 Q, 650
See application file for complete search history.

(56) References Cited

U.S. PATENT DOCUMENTS

| | | |
|---|---|---|
| 2005/0035094 A1 | 2/2005 | Titze et al. |
| 2008/0251232 A1* | 10/2008 | Benedetti ................ B21B 1/463 164/476 |
| 2010/0043514 A1 | 2/2010 | Holmquist et al. |

FOREIGN PATENT DOCUMENTS

| | | |
|---|---|---|
| CN | 102756251 B | 5/2014 |
| JP | 2005199320 A | 7/2005 |

* cited by examiner

US 9,662,723 B2

METHOD AND SYSTEM FOR COMBINED SHEARING OF STEEL PLATE

CROSS-REFERENCE TO RELATED APPLICATIONS

This application represents the national stage entry of PCT International Application No. PCT/CN2014/076350 filed Apr. 28, 2014, which claims priority of Chinese Patent Application No. 201310156882.6, filed Apr. 28, 2013, the disclosures of which are incorporated by reference here in their entirety for all purposes.

FIELD OF THE INVENTION

The present invention relates to the field of unrolling and blanking machining of plate materials for automobiles or household appliances, and particularly to a method and system for combined shearing of a steel plate to obtain a planar profiled sheet.

BACKGROUND

During machining of a steel plate, an unrolling and blanking line can result in a sheared piece with a straight edge or an oblique edge by using a pendulum shear mould, whereas sheets of other complex shapes require blanking in other corresponding moulds to obtain profiled sheets.

Chinese patents CN 102105256 and CN 102216025 disclose various high-speed laser cutting devices, in which multiple sets of laser cutting heads are used to implement a production process of a profiled sheet by means of linking and matching of laser cutting rooms, instead of a traditional unrolling and blanking line using a mould. These methods require re-design and re-planning of new production lines and new sites, which bring about a new technology, but also generate a huge amount of investment and risk.

SUMMARY OF THE INVENTION

An object of the present invention is to provide a method and system for combined shearing of a steel plate, which achieves laser cutting of a profiled material by lateral material discharge from a blanking from a pendulum cutting line, and can share other functional segments of a production line; meanwhile, two blanking methods are combined to achieve cutting of a sheet of any shape, optimizing and improving the function of the production line and reducing the footprint and equipment investment costs.

In order to achieve the above-mentioned object, a technical solution of the present invention is:

a method for combined shearing of a steel plate, which adopts a combination of unrolling and pendulum shearing with laser cutting, wherein after a steel roll is cut by unrolling and pendulum shearing to obtain sheets having a specified length, a part or all of the sheets are directly conveyed to a stack as finished sheet materials and the other part or all of the sheets are transferred to a laser cutting line by means of lateral material discharge from a unrolling and pendulum cutting line, and are picked up by a loading robot and moved to a laser cutting position to subject to a secondary cutting, so as to finally obtain profiled sheet materials which are picked up by a discharged material handling and stacking robot for an operation of stacking the finished products.

Further, said unrolling and pendulum shearing comprise unrolling, cleaning, levelling, looping, specified-length feeding, pendulum shearing, sheet conveying, and stacking.

A part or all of the sheets obtained directly by the unrolling and pendulum shearing are conveyed as finished sheet materials to a stacking position by attraction of a magnetic belt.

Said laser cutting adopts two laser cutting stations arranged in parallel, and uses at least one laser cutting machine to perform a complex path cutting operation on the sheets discharged laterally from a pendulum shearing unit to complete the secondary cutting, finally giving profiled sheets; meanwhile, loading and unloading robots are used to complete loading and unloading operations.

Said laser cutting adopts two laser cutting stations arranged in parallel, which share one loading robot for loading materials, and are each provided with a unloading robot to perform an unloading operation.

A system for combined shearing of a steel plate according to the present invention comprises: an unrolling and pendulum shearing line, comprising in sequence an unrolling machine, a cleaning machine, a straightening machine, a looper, a specified-length feeder, a pendulum shearing machine, a sheet conveying device, and a stacker, the pendulum shearing machine being provided with a longitudinal discharge and a lateral discharge; and a laser cutting line, which is provided at the lateral discharge of the pendulum shearing machine of the unrolling and pendulum shearing line, and comprises in sequence a sheet feeding device, a laser cutting station, and a rack.

Further, the sheet conveying device of said unrolling and pendulum shearing line is a magnetic belt conveyor.

Yet further, said laser cutting line comprises at least a laser generator and a laser cutting machine, and comprises a table for supporting the sheets and allowing waste materials to fall down.

Still further, the sheet feeding device of said laser cutting line comprises a magnetic belt conveyor and a ball-type oblique slippy table, and a chute type sheet receiving table.

Furthermore, the laser cutting station of said laser cutting line according to the present invention comprises two laser cutting machines arranged in parallel; at least one loading robot for loading materials, which is arranged between the two laser cutting machines and performs loading operations of the two laser cutting machines; and at least two unloading robots for performing an unloading operation, corresponding to the two laser cutting machines.

The loading robot is provided with an end tooling for picking up the sheets, and contains an external shaft which enables the robot to move to carry the sheets to a laser cutting table.

The unloading robot is provided with an end tooling for picking up the cut sheets, contains an external shaft which enables the robot to move, and is provided with at least one set of sheet stacking positions.

Said laser cutting line further comprises a waste material transferring belt for transferring cut waste materials and a waste material tank for recovering the waste materials.

The present invention has an advantage in that:

an existing pendulum cutting line can only cut a rectangular or trapezoid material, and a profiled material can only be achieved by replacing the mould. The present invention achieves laser cutting of a profiled material by lateral material discharge from a blanking from a pendulum cutting line, and can share other functional segments of a production line; meanwhile, two blanking methods are combined to achieve cutting of a sheet of any shape, optimizing and improving the function of the production line and reducing the footprint and equipment investment costs.

DETAILED DESCRIPTION

Figure 1:
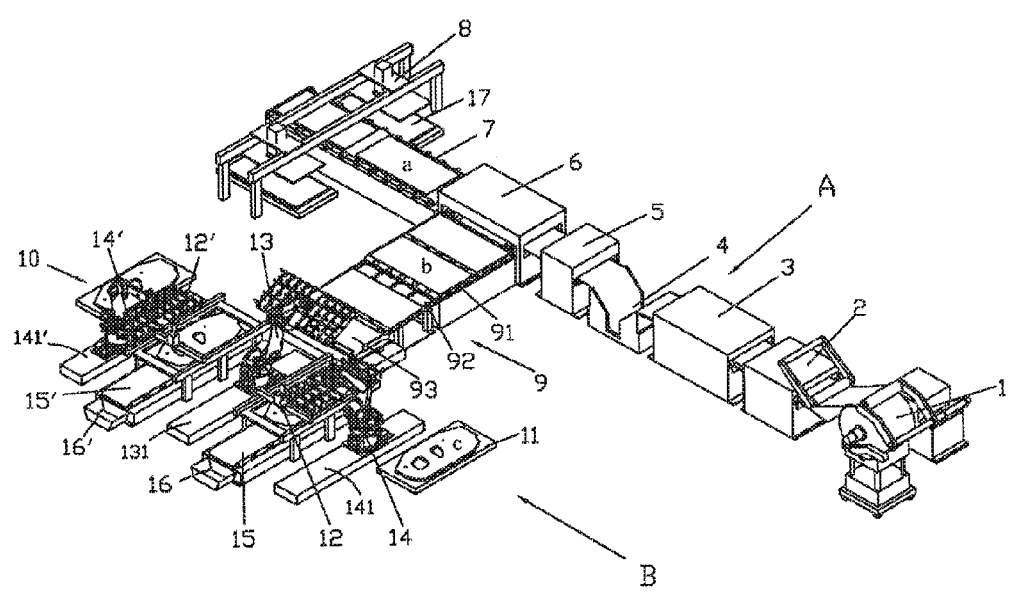
FIG. 1 is a schematic perspective view of a system for combined shearing according to the present invention.

Reference is made to FIG. 1, which is a schematic view of an embodiment of the present invention. A system for combined shearing of a steel plate according to the present invention comprises: an unrolling and pendulum shearing line A, comprising in sequence an unrolling machine 1, a cleaning machine 2, a straightening machine 3, a looper 4, a specified-length feeder 5, a pendulum shearing machine 6, a sheet conveying device 7, and a stacker 8, the pendulum shearing machine 6 being provided with a longitudinal discharge and a lateral discharge; and a laser cutting line B, which is provided at the lateral discharge of the pendulum shearing machine 6 of the unrolling and pendulum shearing line, and comprises in sequence a sheet feeding device 9, a laser cutting station 10, and a rack 11.

In the present embodiment, the sheet conveying device 7 of the unrolling and pendulum shearing line A is a magnetic belt conveyor.

The sheet feeding device 9 of the laser cutting line B comprises a magnetic belt conveyor 91 and a ball-type oblique slippy table 92, and a chute type sheet receiving table 93.

The laser cutting station 10 of the laser cutting line B according to the present invention comprises two laser cutting machines 12, 12' arranged in parallel; a loading robot 13 for loading materials which is arranged between the two laser cutting machines 12, 12', the loading robot 13 performing loading operations of the two laser cutting machines 12, 12'; and two unloading robots 14, 14' for performing an unloading operation, corresponding to the two laser cutting machines 12, 12'.

The loading robot 13 is provided with an end tooling for picking up the sheets, and contains an external shaft 131 which enables the robot to move to carry the sheets to a laser cutting table.

The unloading robot 14, 14' is provided with an end tooling for picking up the cut sheets, contains an external shaft 141, 141' which enables the robot to move, and is provided with at least one set of sheet stacking positions.

Said laser cutting line B further comprises waste material transferring belts 15, 15' for transferring cut waste materials and waste material tanks 16, 16' for recovering the waste materials, which are corresponding to the laser cutting machines 12, 12'.

A method for combined shearing of a steel plate according to the present invention adopts a combination of unrolling and pendulum shearing with laser cutting, wherein after a steel roll is cut by unrolling and pendulum shearing to obtain sheets having a specified length, a part or all of the sheets are directly conveyed to a stack as finished sheet materials and the other part or all of the sheets are transferred to a laser cutting line by means of lateral material discharge from a unrolling and pendulum cutting line, and are picked up by a loading robot and moved to a laser cutting position to subject to a secondary cutting, so as to finally obtain profiled sheet materials which are picked up by a discharged material handling and stacking robot for an operation of stacking the finished products.

Said unrolling and pendulum shearing comprise unrolling, cleaning, levelling, looping, specified-length feeding, pendulum shearing, sheet conveying, and stacking.

A part or all of the sheets obtained directly by the unrolling and pendulum shearing are conveyed as finished sheet materials to a stacking position by attraction of a magnetic belt.

Said laser cutting adopts two laser cutting stations arranged in parallel, and uses at least one laser cutting machine to perform a complex path cutting operation on the sheets discharged laterally from a pendulum shearing unit to complete the secondary cutting, finally giving profiled sheets; meanwhile, loading and unloading robots are used to complete loading and unloading operations.

Said laser cutting adopts two laser cutting stations arranged in parallel, which share one loading robot for loading materials, and are each provided with a unloading robot to perform an unloading operation.

Figure 2:
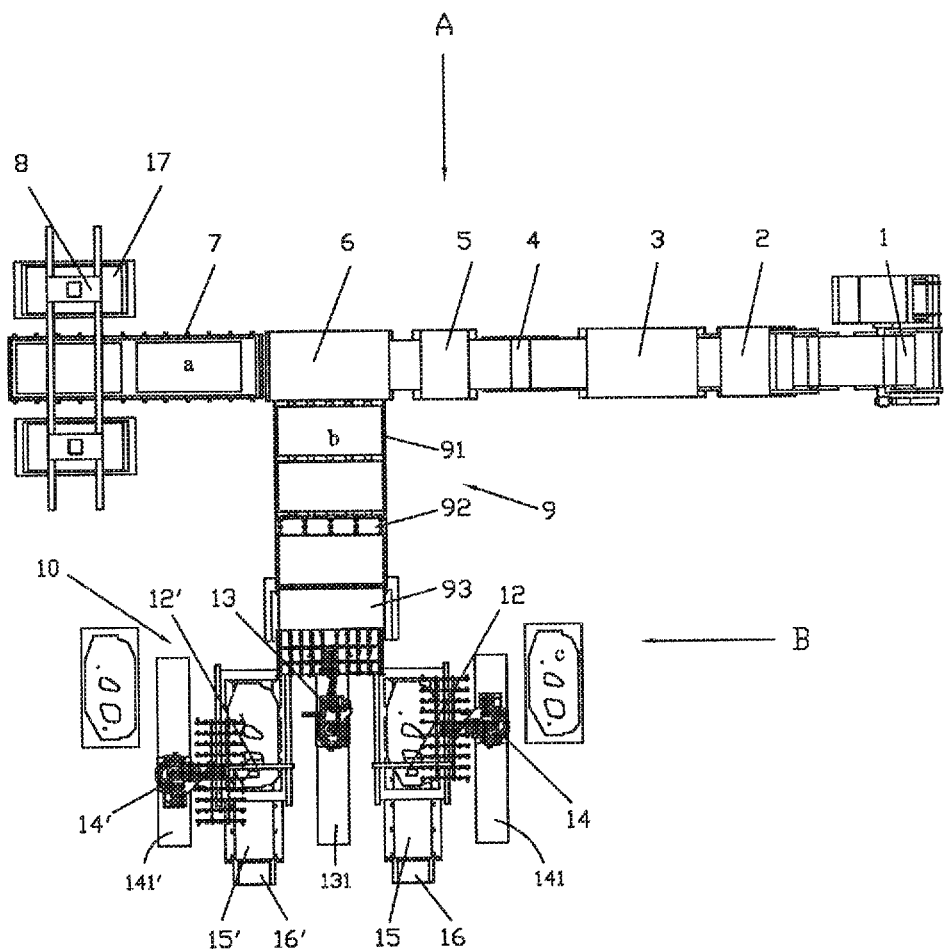
FIG. 2 is a top view of the system for combined shearing according to the present invention.
Figure 3:
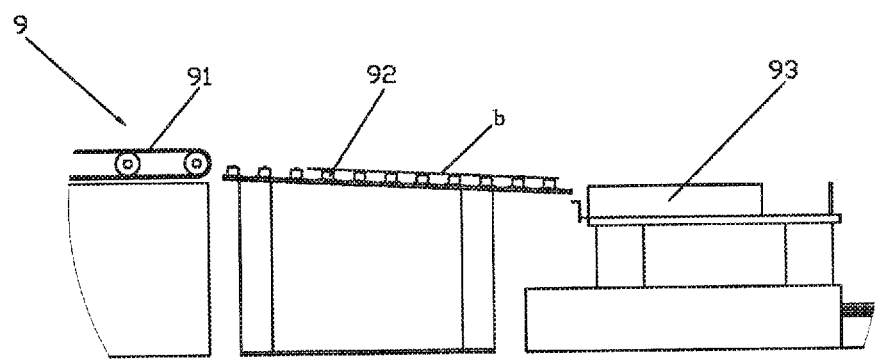
FIG. 3 is a schematic view of a lateral material discharge method according to the present invention.

Referring to FIGS. 1 to 3, a roll of material is unrolled by an unrolling machine 1, and then conveyed through a material introducing roller and a material pressing roller, through the cleaning machine 2, the straightening machine 3, and the looper 4 to the specified-length feeder 5; the cleaned, straightened, and levelled roll material is fed by the specified-length feeder 5 at a production rate and a feeding length to the pendulum shearing machine 6, wherein the roll material, prior to the specified-length feeding, can be lifted up and down within the looper 4, so as to achieve the storage to length and smooth loading of the roll material. The pendulum shearing machine 6 shears a transverse straight edge or an oblique edge of the plate. The finished sheets a obtained by the pendulum shearing machine 6 are received by the magnetic belt conveyor 7 and then conveyed to stacking positions in a longitudinal direction, where they are stacked in two stacks 17 by a magnetic stacker 8.

The specified-length sheets b laterally discharged from the pendulum shearing machine 6 are fed by the magnetic belt conveyor 91 to the ball-type oblique slippy table 92 and then onto a chute type sheet receiving table 93, and finally to a position below a feeding position of the loading robot 13.

The loading robot 13 grabs a specified-length sheet b on the sheet receiving plane by an end tooling at one end of a robotic arm, and places same onto a cutting table of the laser cutting machine 12, and the laser cutting machine 12 perform a complex path cutting operation on the sheet according to a planned path so as to obtain more than one secondary-cut profiled finished sheet c. After placing the sheet, the loading robot 13 grabs a second specified-length sheet b and places same onto a cutting table of the laser cutting machine 12', so as to obtain more than one secondary-cut profiled finished sheet c. The loading robot 13 is provided with a linear guide rail 131, enabling the robot to perform a travelling operation, and to work between the sheet receiving table and the cutting table. After the cutting operations at the two tables are completed, the unloading robot 14 picks up the profiled finished sheet c on the cutting tables c by an end tooling on a robotic arm thereof, and stacks same onto the rack 11, and the unloading robot 14 travels linearly by means of a linear guide rail 141, such that each unloading robot can achieve stacking of profiled sheets at more than one stacking positions. The loading robot 13 is responsible for the loading operations at the two cutting tables, the unloading robots 14, 14' are each responsible for the material discharge operation of a single cutting table, the laser cutting machine on the cutting table is returned to the standby position once the cutting operation is completed, waiting for feeding or discharging.

After the cutting of the sheets on the cutting tables is completed, waste materials fall down to waste material conveyor belts 15, 15', and then fall into waste material tanks 16, 16' for collection.

An example to be cut as illustrated in FIG. 1 is a side wall sheet, wherein a laser cutting machine performs a secondary cutting operation on the specified-length sheet and then obtains a sheet material and a corresponding stack. When cutting other sheets, such as fenders and other small pieces, a laser cutting machine can produce more than two profiled finished sheets and more than two corresponding stacks from one laterally discharged sheet.

FIG. 2 is a top view of this embodiment, wherein the laterally discharged specified-length sheet b is received by a segmented magnetic belt conveyor 91, the magnetic belt being divided into two regions: a magnetization part and a demagnetization part, the magnetization part attracting and transporting the sheet, and the demagnetization part transporting the sheet and throwing same to the oblique slippy table 92.

The secondary machining is performed by two laser cutting machines to expand the production capacity. The specified-length sheets are supported and placed on the cutting tables of the laser cutting machines 12, 12', the cutting tables serving to support the sheets, and allowing the cut waste materials to fall onto the waste material conveyor belts and not to remain on the cutting tables.

FIG. 3 is a schematic view of a lateral discharge of the pendulum shearing machine 6 according to the present invention. When the profiled sheet is cut, a first-cut specified-length sheet b is obtained by a pendulum shearing machine 6, and the specified-length sheet b is laterally discharged from the pendulum shearing machine 6, received by the magnetic belt conveyor 91 and output to the ball-type oblique slippy table 92. A segmented magnetic belt is employed, which is magnetic when receiving and conveying the sheet, and is non-magnetic when throwing the sheet to the ball-type oblique slippy table 92. The sheet slides onto the chute-type sheet receiving table 93 under the action of the oblique table and the guiding of balls, and the specified-length sheet b on the sheet receiving platform is picked up by the loading robot 14 for subsequent operations.

What is claimed is:

1. A method for combined shearing of a steel plate, which adopts a combination of unrolling and pendulum shearing with laser cutting, wherein after a steel roll is cut by unrolling and pendulum shearing to obtain sheets having a specified length, a part or all of the sheets are directly conveyed to a stack as finished sheet materials and the other part or all of the sheets are transferred to a laser cutting line by means of lateral material discharge from a unrolling and pendulum cutting line, and are picked up by a loading robot and moved to a laser cutting position to subject to a secondary cutting, so as to finally obtain profiled sheet materials which are picked up by a discharged material handling and stacking robot for an operation of stacking the finished products.

2. The method for combined shearing of a steel plate of claim 1, characterized in that said unrolling and pendulum shearing comprise unrolling, cleaning, levelling, looping, specified-length feeding, pendulum shearing, sheet conveying, and stacking.

3. The method for combined shearing of a steel plate of claim 1, characterized in that a part or all of the sheets obtained directly by the unrolling and pendulum shearing are conveyed as finished sheet materials to a stacking position by attraction of a magnetic belt.

4. The method for combined shearing of a steel plate of claim 1, characterized in that said laser cutting adopts two laser cutting stations arranged in parallel, and uses at least one laser cutting machine to perform a complex path cutting operation on the sheets discharged laterally from a pendulum shearing unit to complete the secondary cutting, finally giving profiled sheets; meanwhile, loading and unloading robots are used to complete loading and unloading operations.

5. The method for combined shearing of a steel plate of claim 1, characterized in that said laser cutting adopts two laser cutting stations arranged in parallel, which share one loading robot for loading materials, and are each provided with a unloading robot to perform an unloading operation.

6. A system for combined shearing of a steel plate, comprising,
   an unrolling and pendulum shearing line, comprising in sequence an unrolling machine, a cleaning machine, a straightening machine, a looper, a specified-length feeder, a pendulum shearing machine, a sheet conveying device, and a stacker, the pendulum shearing machine being provided with a longitudinal discharge and a lateral discharge; and
   a laser cutting line, which is provided at the lateral discharge of the pendulum shearing machine of the unrolling and pendulum shearing line, and comprises in sequence a sheet feeding device, a laser cutting station, and a rack.

7. The system for combined shearing of a steel plate as claimed in claim 6, characterized in that the sheet conveying device of said unrolling and pendulum shearing line is a magnetic belt conveyor.

8. The system for combined shearing of a steel plate of claim 6, characterized in that said laser cutting line comprises at least a laser generator and a laser cutting machine, and comprises a table for supporting the sheets and allowing waste materials to fall down.

9. The system for combined shearing of a steel plate of claim 6, characterized in that the sheet feeding device of said laser cutting line comprises a magnetic belt conveyor and a ball-type oblique slippy table, and a chute type sheet receiving table.

10. The system for combined shearing of a steel plate of claim 6, characterized in that the laser cutting station of said laser cutting line comprises two laser cutting machines arranged in parallel; at least one loading robot for loading materials, which is arranged between the two laser cutting machines and performs loading operations of two laser cutting positions; and at least two unloading robots for performing an unloading operation, corresponding to the two laser cutting positions.

11. The system for combined shearing of a steel plate of claim 6, characterized in that the loading robot is provided with an end tooling for picking up the sheets, and contains an external shaft which enables the robot to move to carry the sheets to a laser cutting table.

12. The system for combined shearing of a steel plate of claim 6, characterized in that the unloading robot is provided with an end tooling for picking up the cut sheets, contains an external shaft which enables the robot to move, and is provided with at least one set of sheet stacking positions.

13. The system for combined shearing of a steel plate of claim 6, characterized in that said laser cutting line further comprises a waste material transferring belt for transferring cut waste materials and a waste material tank for recovering the waste materials.

\* \* \* \* \*